(12) United States Patent
Tanaka et al.

(10) Patent No.: US 6,474,750 B2
(45) Date of Patent: Nov. 5, 2002

(54) BRAKE CONTROL DEVICE FOR A VEHICLE

(75) Inventors: Wataru Tanaka, Anjo (JP); Toshiaki Hamada, Okazaki (JP); Hirofumi Nitta, Obu (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/938,647

(22) Filed: Aug. 27, 2001

(65) Prior Publication Data

US 2002/0027388 A1 Mar. 7, 2002

(30) Foreign Application Priority Data

Aug. 25, 2000 (JP) ........................................ 2000-255624

(51) Int. Cl.$^7$ ................................................ B60T 8/32
(52) U.S. Cl. ..................................... 303/113.4; 303/155
(58) Field of Search ........................... 303/113.2–113.5, 303/116.1, 116.2, 139, 140, 146, 148, 149, 150, 155

(56) References Cited

U.S. PATENT DOCUMENTS 5,039,175 A * 8/1991 Holzmann et al. ........ 303/116.2
5,044,700 A * 9/1991 Willmann ................... 188/358
5,411,322 A * 5/1995 Breen ............................ 303/7
6,017,101 A * 1/2000 Matsuda ..................... 303/140
6,189,643 B1 * 2/2001 Takahashi et al. .......... 180/248
6,196,643 B1 * 3/2001 Yokoyama et al. ......... 303/166
6,334,655 B2 * 1/2002 Tanaka et al. ............ 303/113.4

FOREIGN PATENT DOCUMENTS

DE 19703776 * 8/1998

* cited by examiner

Primary Examiner—Christopher P. Schwartz
(74) Attorney, Agent, or Firm—Burns, Doane, Swecker & Mathis, LLP (57) ABSTRACT

A vehicle brake control device includes a brake member, a wheel brake cylinder mounted on a wheel, and a master cylinder. The master cylinder generates a master cylinder hydraulic pressure in response to an operating force applied to the brake member. The brake control device also includes an automatic pressure increasing control device, a braking force control device, a coefficient of friction detecting device that detects a coefficient of friction of the road, and an automatic pressure increasing restraining device. The automatic pressure increasing control device controls automatic pressure increasing operation of the master cylinder based on the operating force applied to the brake member. The braking force control device controls the increased master cylinder hydraulic pressure supplied to the wheel brake cylinder. The automatic pressure increasing restraining device restrains automatic pressure increasing operation of the master cylinder when anti-skid control is being performed with a low coefficient of friction.

15 Claims, 5 Drawing Sheets

BRAKE CONTROL DEVICE FOR A VEHICLE

This application is based on and claims priority under 35 U.S.C. §119 with respect to Japanese Application No. 2000-255624 filed on Aug. 25, 2000, the entire content of which is incorporated herein by reference.

FIELD OF THE INVENTION

This invention generally relates to a brake control device for a vehicle. More particularly, the present invention pertains to a vehicle brake control device for generating a master cylinder hydraulic pressure in a master cylinder in response to a brake pedal operational force, and to a vehicle brake control device for automatically increasing the master cylinder hydraulic pressure generated in the master cylinder to assist the brake pedal operation.

BACKGROUND OF THE INVENTION

A known brake control device for a vehicle is disclosed in a German Patent Laid-Open Publication No. 197 03 776 A1. This known brake control device includes a hydraulic pressure generating device and a hydraulic pressure increasing device. The hydraulic pressure generating device activates a master cylinder to generate a master cylinder hydraulic pressure in response to a brake pedal operational force. The hydraulic pressure increasing device introduces a servo pressure to a pressure chamber included in the hydraulic pressure generating device. The master cylinder hydraulic pressure is automatically increased by the hydraulic pressure increasing device and other units to assist the brake pedal operation.

In this way, the master cylinder hydraulic pressure is automatically increased with a constant amplification ratio by the hydraulic pressure increasing device in proportion to the brake pedal operational force. Therefore, for example, if an anti-skid control is being applied to a vehicle driving on a slippery road (hereinafter, referred to as a road with a low coefficient of friction) having a relatively small coefficient of friction, when this automatic pressure increasing operation is applied to the master cylinder hydraulic pressure, the brake pressure in each wheel brake cylinder is controlled on the basis of the increased master cylinder hydraulic pressure. In this case, the anti-skid control may not be performed in a stable manner because the wheel brake cylinder brake pressure which should be adjusted to become a low value is controlled on the basis of the excessive master cylinder hydraulic pressure. In this case, a pressure differential between the pressurized master cylinder hydraulic pressure and the wheel brake cylinder brake pressure may become large, wherein an undesired noise during performance of the anti-skid control may occur.

Further, when a coefficient of friction (hereinafter, referred to as a coefficient of friction p on a road) is varied with the vehicle driving, the pressure increase amount applied to the master cylinder hydraulic pressure by the hydraulic pressure increasing device may exceed a desirable amount thereof in some cases, or may be lower than the desirable amount in other cases, wherein a sufficient braking force may not be applied to each wheel.

A need thus exists for a brake control device for a vehicle that is able to increase the master cylinder hydraulic pressure automatically in a way that improves the operation of the anti-skid control in response to the change of the coefficient of friction on the driving road, especially when the vehicle is traveling on a road having a low coefficient of friction $\mu$.

SUMMARY OF THE INVENTION

A brake control device for a vehicle includes a brake operating member, a wheel, a wheel brake cylinder mounted on the wheel, and a hydraulic pressure generating device. The hydraulic pressure generating device generates a master cylinder hydraulic pressure in a master cylinder in response to the operating force applied to the brake operating member. The brake control device for the vehicle further includes an automatic pressure increasing control device, a braking force control device, a coefficient of friction detecting device, and an automatic pressure increasing restraining device. The automatic pressure increasing control device increases the master cylinder hydraulic pressure automatically in response to the operating force applied to the brake operating member. The braking force control device controls a hydraulic pressure applied to the wheel brake cylinder by using the master cylinder hydraulic pressure. The coefficient of friction detecting device detects a coefficient of friction on the vehicle driving road. The automatic pressure increasing restraining device restrains a pressure increase amount of the master cylinder hydraulic pressure by the automatic pressure increasing control device when an anti-skid control is being performed by the braking force control device when the coefficient of friction detected by the coefficient of friction detecting device is less than a predetermined value.

According to another aspect of the invention, a brake control device for a vehicle includes a brake operating member, a hydraulic pressure generating device for generating a master cylinder hydraulic pressure in a master cylinder in response to an operating force applied to the brake operating member, a plurality of wheels, a plurality of wheel brake cylinders each mounted on a respective one of wheels, a pressure chamber defined in the master cylinder, a pressure increasing device for introducing a servo pressure into the pressure chamber to increases the master cylinder hydraulic pressure with the servo pressure, and an automatic pressure increasing control device for controlling the servo pressure introduced to the pressure chamber by the pressure increasing device and for controlling a pressure increase amount of the master cylinder hydraulic pressure. A braking force control device controls the hydraulic pressure applied to each wheel brake cylinder using the master cylinder hydraulic pressure, and a servo pressure memorizing device memorizes the servo pressure controlled by the automatic pressure increasing control device when an anti-skid control begins to be applied to all of the wheels by the braking force control device. A vehicle deceleration change detecting device detects a vehicle deceleration change occurring after the anti-skid control begins to be applied to all vehicle wheels, and a servo pressure correcting device correct the memorized servo pressure on the basis of the vehicle deceleration change detected by the vehicle deceleration change detecting device. The automatic pressure increasing control device employs the corrected servo pressure as an upper limit of the servo pressure and controls the pressure increase amount of the master cylinder hydraulic pressure while the anti-skid control is being applied to the all of the wheels.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
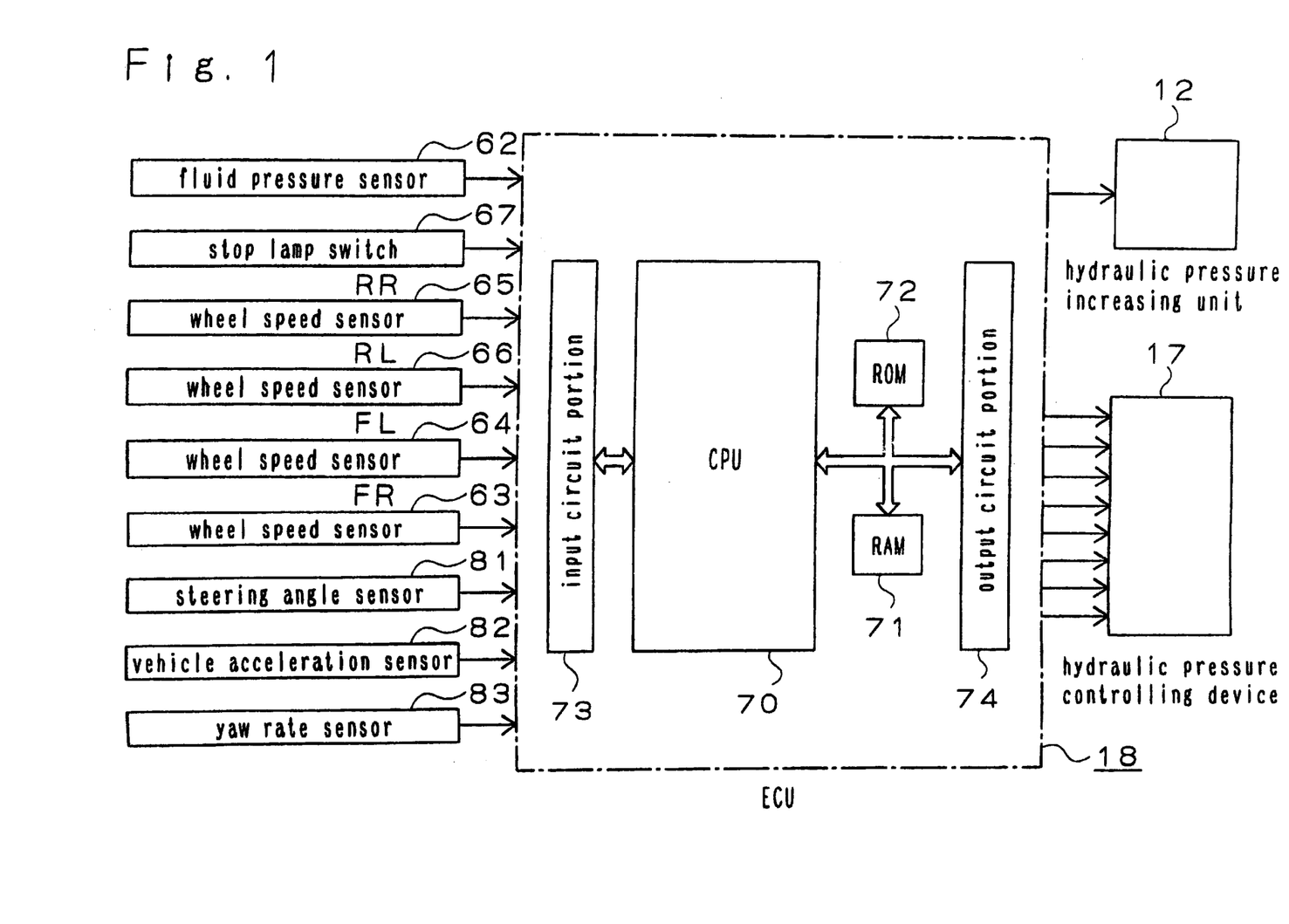
FIG. 1 is a schematic block diagram of an electronic control unit (ECU) used in a brake control device according to the present invention.
Figure 2:
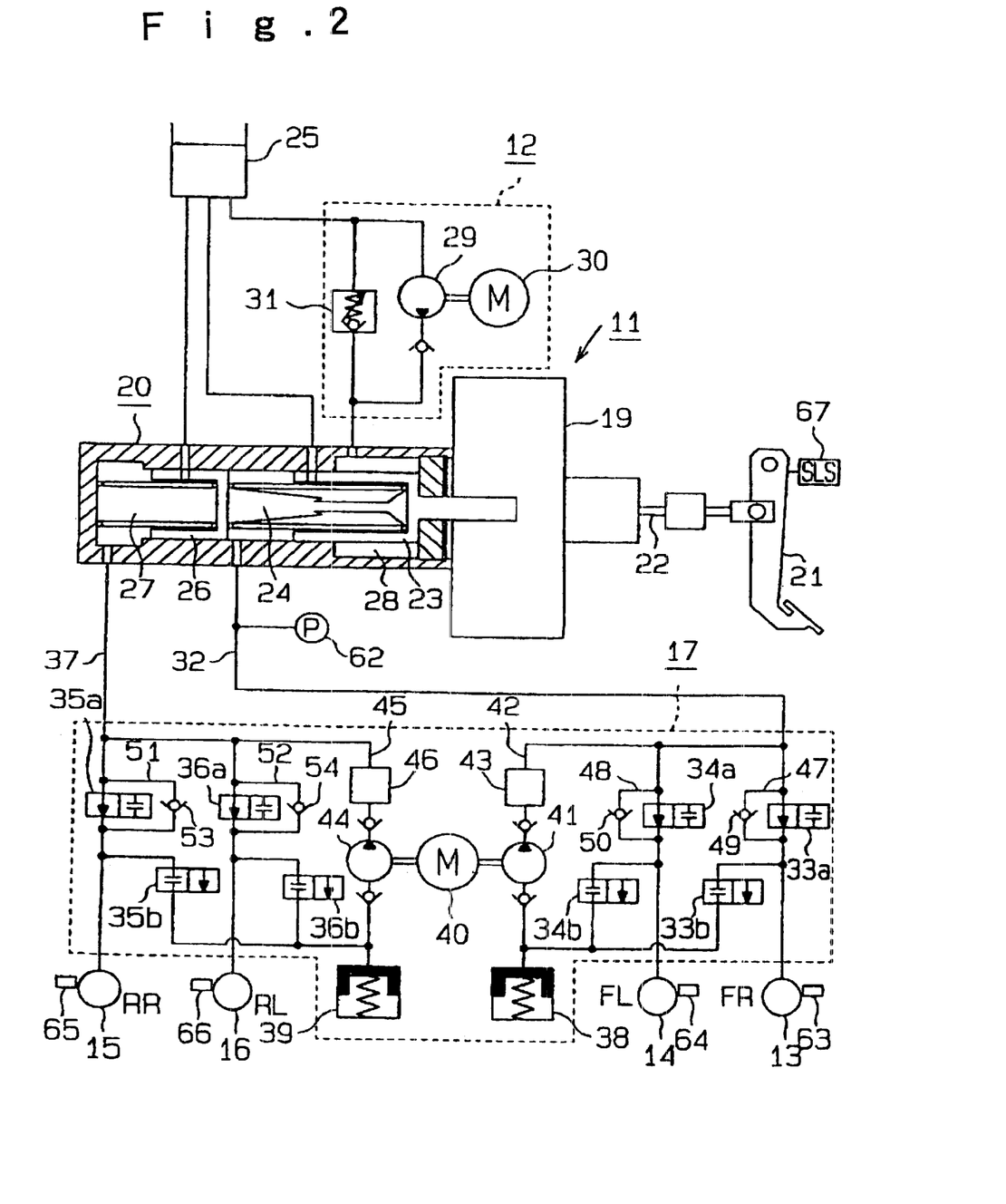
FIG. 2 is a schematic illustration, partially in cross-section, of the overall structure of the brake control device of the present invention.

Referring initially to FIG. 2, a brake control device according to one embodiment of the present invention includes a hydraulic pressure generating device 11 for generating a hydraulic pressure and a hydraulic pressure increasing unit 12. The hydraulic pressure generating device 11 is connected to the hydraulic pressure increasing unit 12 which introduces a servo pressure for increasing the hydraulic pressure generated by the hydraulic pressure generating device 11. The brake control device further includes a front right wheel FR, a front left wheel FL, a rear right wheel RR, a rear left wheel RL, and a respective wheel brake cylinder 13, 14, 15, 16 mounted on each wheel. The brake control device further includes a hydraulic pressure controlling device 17 for controlling the brake hydraulic pressure supplied to the wheel brake cylinders 13, 14, 15, 16 and an electronic control unit (ECU) as shown in FIG. 1 for controlling the braking force applied to each wheel in response to a vehicle condition.

The hydraulic pressure generating device 11 is provided with a vacuum booster 19 and a master cylinder 20. The overall structure of the master cylinder 20 illustrated in FIG. 2 represents a somewhat simplified illustration for purposes of facilitating an understanding of the present invention. Thus, structural details such as the sealing members are not illustrated.

A brake pedal operational force applied to a brake pedal 21 is amplified. by the lever ratio of a link mechanism and is transmitted to an operating rod 22. The operating rod 22 is pushed in response to the increased brake pedal operational force in a forward direction (i.e., to the left in FIG. 2). The brake pedal operational force applied to the operating rod 22 is boosted by the vacuum booster 19 and transmitted to a first master piston 23 of the master cylinder 20. The first piston 23 is pushed in response to the boosted brake pedal operational force in the forward direction (i.e., to the left in FIG. 2). When the first master piston 23 is pushed against a rearward pushing force of a return spring and is moved from an initial position illustrated in FIG. 2, fluid communication between a first pressure chamber 24 and a reservoir 25 is interrupted. Hydraulic pressure is thus generated in the first pressure chamber 24 corresponding to the hydraulic pressure Pmcin in response to the brake pedal operational force. A second piston 26 of the master cylinder 20 is pushed in the forward direction by the hydraulic pressure corresponding to the hydraulic pressure Pmcin in response to the brake pedal operational force. Further the second piston 26 is pushed in the forward direction against the rearward pushing force of another return spring and is moved from an initial position illustrated in FIG. 2. Therefore, fluid communication between a second pressure chamber 27 and the reservoir 25 is interrupted, wherein a hydraulic pressure is similarly generated in the second pressure chamber 27. Hereinafter, the phrase "boosted by the vacuum booster 19" includes the brake pedal operational force being amplified by the lever ratio of the link mechanism.

The master cylinder further includes a third pressure chamber 28 provided behind the end surface of the first master piston 23 at the vacuum booster 19 side. The hydraulic pressure generated by the hydraulic pressure increasing unit 12 is fed into the third pressure chamber 28. The first piston 23 is pushed by the hydraulic pressure fed into the third pressure chamber 28, i.e. by a hydraulic pressure P3 of the third pressure chamber 28. Corresponding to the forward movement of the first master piston 23, a servo pressure Pmc3 is generated in the first pressure chamber 24.

As described above, the master cylinder 20 serves to generate a master cylinder hydraulic pressure Pmc including the hydraulic pressure corresponding to the hydraulic pressure Pmcin in response to the brake pedal operational force boosted by the vacuum booster 19 and the servo pressure Pmc3 generated in response to the hydraulic pressure fed into the third pressure chamber 28 from the hydraulic pressure increasing unit 12.

The hydraulic pressure increasing unit 12 includes a pump 29, an electric motor 30 for activating the pump 29, and a linear valve 31. The pump 29 pressurizes brake fluid stored in the reservoir 25 and transmits the pressurized brake fluid to the third pressure chamber 28. The degree of opening of the linear valve 31 is varied in response to an electric current value of an inputted signal (a control signal). Brake fluid ejected or discharged from the pump 29 returns to the reservoir 25 through the linear valve 31. Therefore, when the control signal representing the electric current value is outputted from the ECU 18 to the linear valve 31, a desirable hydraulic pressure P3 corresponding to the control signal (the electric current value) is introduced into the third pressure chamber 28. The introduced hydraulic pressure P3 is a pressure differential between the hydraulic pressure fed from the pump 29 and the hydraulic pressure returned to the reservoir 25 corresponding to the opening degree of the linear valve 31.

The master cylinder hydraulic pressure Pmc generated by the master cylinder 20 is supplied to each wheel brake cylinder 13, 14, 15, 16 which are divided into a front wheel side and a rear wheel side by two main hydraulic conduits 32, 37. That is, the hydraulic pressure controlling device 17 connects the master cylinder 20 and the wheel brake cylinders 13, 14, 15, 16 employing a front-rear hydraulic circuit system.

More specifically, the hydraulic pressure generated by the first pressure chamber 24 is transmitted to the first main conduit (hydraulic passage) 32. The first main conduit includes a pair of first branch conduits and a solenoid valve 33a, 34a is disposed in each of the first branch conduits. The first main conduit 32 is connected to each wheel brake cylinder 13, 14 respectively via the pair of first branch conduits and the solenoid valves 33a, 34a. Two second branch conduits of the first main conduit 32 are also provided, one connected at a point between the solenoid valve 33a and the wheel brake cylinder 13, and the other connected at a point between the solenoid valve 34a and the wheel brake cylinder 14. A respective solenoid valve 33b, 34b is disposed in each of the two second branch conduits. The two second branch conduits are connected to a reservoir 38 via the solenoid valves 33b, 34b.

The hydraulic pressure generated by the second pressure chamber 27 is transmitted to the second main conduit (hydraulic passage) 37. The second main conduit 37 also includes a pair of first branch conduits, and a solenoid valve 35a, 36a is disposed in each of the first branch conduits of the second main conduit 37. The second main conduit 37 is connected to each wheel brake cylinder 15, 16 respectively via the pair of first branch conduits and the solenoid valves 35a, 36a. Two second branch conduits of the second main conduit 37 are also provided, one connected at a point between the solenoid valve 35a and the wheel brake cylinder 15, and the other connected at a point between the solenoid valve 36a and the wheel brake cylinder 16. A respective solenoid valves 35b, 36b is disposed in each of the two second branch conduits. The pair of second branch conduits is connected to a reservoir 39 via the solenoid valves 35b, 36b.

Each solenoid valve 33a, 34a, 35a, 36a is a normally-open type solenoid valve and serves to supply the brake hydraulic pressure to the respective wheel brake cylinder when each solenoid valve is not excited or is not energized. Each solenoid valve 33b, 34b, 35b, 36b is a normally-closed type solenoid valve and serves to interrupt the brake hydraulic pressure to the respective reservoir 38, 39 when each solenoid valve is not excited or is not energized. All of these solenoid valves are excited or energized by a hydraulic pressure control signal (a control electric current) outputted from the ECU 18.

Additional details associated with the hydraulic pressure control device 17 are described below with reference to the solenoid valves 33a, 33b for the front right wheel FR. A detailed description of the other solenoid valves is omitted for purposes of simplifying the description, it being understood that the other solenoid valves operate in manner similar to that described below. When the normally-open type solenoid valve 33a and the normally-closed type solenoid valve 33b are not excited or are not energized, the wheel brake cylinder 13 is connected to the master cylinder 20 and is disconnected from the reservoir 38. Therefore, the wheel brake cylinder 13 is in a pressure increasing condition in which the brake hydraulic pressure in the wheel brake cylinder 13 is increased. When both solenoid valves 33a, 33b are excited or energized, the solenoid valve 33a is closed and the solenoid valve 33b is opened. In this case, the wheel brake cylinder 13 is disconnected from the master cylinder 20 and is connected to the reservoir 38. Therefore, the wheel brake cylinder 13 is in a pressure decreasing condition in which the brake hydraulic pressure in the wheel brake cylinder 13 is decreased. When the solenoid valve 33a is excited or energized (closed) and the solenoid valve 33b is de-excited or de-energized (closed), the wheel brake cylinder 13 is disconnected from the reservoir 38 and the master cylinder 20. Therefore, the wheel brake cylinder 13 is in a pressure maintaining condition in which the brake hydraulic pressure in the wheel brake cylinder 13 is maintained.

As described above, the brake hydraulic pressure supplied to each wheel brake cylinder 13, 14, 15, 16 is varied in response to the switching of the hydraulic pressure control signals outputted from the ECU 18 to each solenoid valve. That is, the braking force applied to each wheel is controlled by switching or the hydraulic pressure control signals.

The brake fluid stored in the reservoir 38 is pumped up by a pump 41 that is activated by an electric motor 40. Two check valves and a damper 43 are disposed in a pump conduit (a hydraulic passage) 42. The brake fluid pumped up by the pump 41 is returned to a point upstream of the solenoid valves 33a, 34a via one of the check valves and the damper 43.

In the same manner, the brake fluid stored in the reservoir 39 is pumped up by a pump 44 that is activated by the electric motor 40. Two check valves and a damper 46 are disposed in a pump conduit (a hydraulic passage) 45. The brake fluid pumped up by the pump 41 is returned to a point upstream of the solenoid valves 35a, 36a via one of the check valves and the damper 46.

A respective return conduit 47, 48 is connected to each of the pair of first branch conduits of the first main conduit 32. Brake fluid is returned from each wheel brake cylinder 13, 14 to the master cylinder 20 via the respective return conduit 47, 48 and bypasses the respective solenoid valve 33a, 34a. A respective check valve 49, 50 is disposed in each return conduit 47, 48 and allows brake fluid to flow only toward the master cylinder 20.

In the same manner, a respective return conduit 51, 52 is connected to each of the pair of first branch conduits of the second main conduit 37. Brake fluid is returned from each wheel brake cylinder 15, 16 to the master cylinder 20 via the respective return conduit 51, 52 and bypasses the respective solenoid valve 35a, 36a. A respective check valve 53, 54 is disposed in each return conduit 51, 52 and allows brake fluid to flow only toward the master cylinder 20.

A fluid pressure sensor 62 is connected to the first main conduit 32 to detect the master cylinder hydraulic pressure Pmc generated by the master cylinder 20. A wheel speed sensor 63, 64, 65, 66 is mounted on each respective wheel FR, FL, RR, RL to detect the wheel speed of each wheel. Further, a coefficient of friction detecting device is provided for judging a coefficient of friction of the driving road. An stop lamp switch (SLS) 67 is mounted on the brake pedal 21 and is turned on in response to brake pedal 21 depression by the driver.

The structure of the electronic control unit (ECU) 18 is illustrated in FIG. 1 and includes a microcomputer as a main unit. More specifically, the ECU 18 includes a central processing unit (CPU) 70, a random access memory (RAM) 71, a read-only memory (ROM) 72, an input circuit portion 73, and an output circuit portion 74. The input circuit portion 73 is connected to the fluid pressure sensor 62, the stop lamp switch 67, and each of the wheel speed sensors 63, 64, 65, 66. The input circuit portion 73 is further connected to a steering angle sensor 81, a vehicle acceleration sensor 82, and a yaw rate sensor 83. The steering angle sensor 81 detects the steering angle while the yaw rate sensor 83 detects the vehicle yaw rate. The vehicle acceleration sensor 82 (a vehicle deceleration change detecting device) detects an acceleration (a vehicle deceleration gx) in a vehicle longitudinal direction and an acceleration in a lateral direction. The output circuit portion 74 is connected to the electric motor 30 and the linear valve 31 which are included in the hydraulic pressure increasing unit 12, and the solenoid valves 33a, 34a, 35a, 36a, 33b, 34b, 35a, 36b and the electric motor 40 which are included in the hydraulic pressure controlling device 17.

The ECU 18 detects the brake pedal operational force or the vehicle driving condition on the basis of input from each of the sensors 62, 63, 64, 65, 66, 67, 81, 82, 83. The ECU 18 controls an automatic pressure increasing operation of the master cylinder hydraulic pressure Pmc by the hydraulic pressure increasing unit 12 in response to the detected brake pedal operational force or the detected vehicle driving condition. The ECU 18 further activates the hydraulic pressure controlling device 17 and controls the braking force applied to each wheel.

The ECU 18 performs a vehicle stability control for controlling the braking force applied to each wheel on the basis of the detected vehicle driving condition when a vehicle steering control is being performed, wherein deviation from a target line is decreased. The ECU 18 performs an anti-skid control for controlling the braking force applied to each wheel on the basis of the detected vehicle driving condition when the braking force is being applied to each wheel, wherein each wheel is prevented from being locked. The ECU 18 further performs a traction control for applying the braking force to driving wheels when the vehicle is being accelerated, wherein any of the driving wheels is prevented from slipping. To perform these controls, the ECU 18 controls the activation of the electric motor 30 and the electric current value of the control signal outputted to the linear valve 31 on the basis of the detected vehicle driving condition. Therefore, the ECU 18 controls the hydraulic pressure P3 fed into the third pressure chamber 28 by the hydraulic pressure increasing unit 12, wherein the master cylinder hydraulic pressure Pmc generated by the master cylinder 20 is controlled. Further, the ECU 18 controls the solenoid valves 33a, 34a, 35a, 36a, 33b, 34a, 35a, 36b and the electric motor 40 of the hydraulic pressure controlling device 17 to thereby control the braking force applied to each wheel.

When the detected master cylinder hydraulic pressure Pmc exceeds a hydraulic pressure corresponding to the maximum brake pedal operational force boosted by the vacuum booster 19, the ECU 18 changes the hydraulic pressure P3 of the third pressure chamber 28. The ECU 18 further controls the automatic pressure increasing operation of the master cylinder hydraulic pressure Pmc by the servo pressure Pmc3 corresponding to the hydraulic pressure P3. However, when the vehicle drives on a road having a low coefficient of friction $\mu$ when the anti-skid control is being performed, the automatic pressure increasing operation of the master cylinder hydraulic pressure Pmc is stopped.

Figure 3:
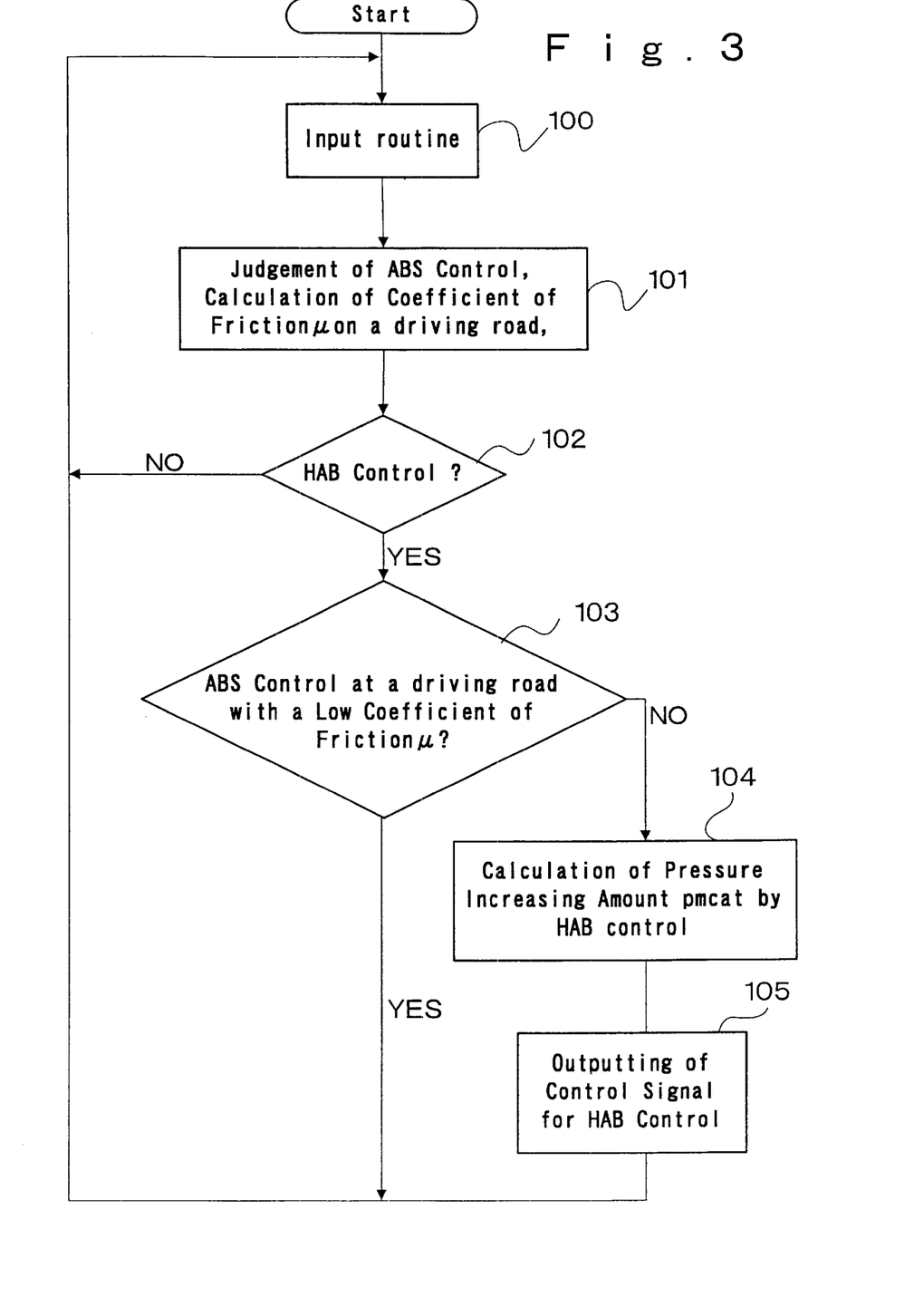
FIG. 3 is a flowchart illustrating the overall operation of the ECU according to one embodiment of the present invention.

Referring to the flowchart shown in FIG. 3, the operation of the brake control device according to one embodiment of the present invention. The process shown in FIG. 3 is performed or initiated when an ignition switch of the vehicle is turned on and the engine is activated. After completing the initial setting, the program proceeds to step 100. At step 100, an input routine is performed for receiving each detected signal outputted from the fluid pressure sensor 62, the stop lamp switch 67, the wheel speed sensors 63, 64, 65, 66, the steering angle sensor 81, the vehicle acceleration sensor 82, and the yaw rate sensor 83.

The program then proceeds to step 101 at which the ECU 18 determines if a current control mode is an anti-skid control mode (hereinafter, referred to as an ABS control). The determination of the ABS control is performed by recognizing each flag of each control mode renewed in response to the vehicle driving condition detected by the input routine. Further, at step 101, the ECU 18 calculates a current coefficient of friction j on the driving road in accordance with a known equation on the basis of the vehicle driving condition (e.g., each wheel speed) detected by the input routine.

At step 102, the ECU 18 judges if the automatic pressure increasing control (hereinafter, referred to as HAB control or high-power assist brake control) of the master cylinder hydraulic pressure Pmc is being performed. The determination of whether HAB control is being performed is carried out by recognizing if the detected master cylinder hydraulic pressure Pmc exceeds a hydraulic pressure KPMC (hereinafter, referred to as HAB control initiating set pressure KPMC) corresponding to the maximum brake pedal operational force boosted by the vacuum booster 19. That is, when the master cylinder hydraulic pressure Pmc exceeds the HAB control initiating set pressure KPMC, the ECU 18 judges that the HAB control is being performed. On the other hand, when the master cylinder hydraulic pressure Pmc does not exceed the HAB control initiating set pressure KPMC, the ECU 18 judges that the HAB control is not being performed.

If the ECU 18 judges that HAB control is not being performed, the program returns to step 100. If the ECU 18 judges that the HAB control is being performed, the program proceeds to step 103. At step 103, the ECU 18 determines whether or not ABS control is being performed on a road having a relatively low coefficient of fiction $\mu$. The judgment of the ABS control is performed on the basis of the flag of each control mode recognized at step 101. The judgment of the road having the low coefficient of friction $\mu$ is performed by recognizing that the coefficient of friction $\mu$ of the road that is calculated at step 101 is less than a predetermined value.

When the ECU 18 judges at step 103 that the ABS control is being performed on a road having a low coefficient of friction $\mu$, the program returns to step 100 without performing the HAB control. That is, when the ABS control is being performed on a road having a low coefficient of friction $\mu$, the HAB control is not performed for restraining increasing of the master cylinder hydraulic pressure Pmc, wherein each wheel brake cylinder brake pressure is controlled to be decreased.

If the ECU 18 judges at step 103 that the ABS control is not being performed on a road having a low coefficient of friction $\mu$, (i.e., that ABS control is being performed on a road having a relatively high coefficient of friction $\mu$ or that other control modes are being performed), the program proceeds to step 104. At step 104, a pressure increasing amount pmcat by the HAB control is calculated. More specifically, a master cylinder hydraulic pressure changing speed dPmc is calculated based on a pressure differential between this master cylinder hydraulic pressure Pmc' detected by the fluid pressure sensor 62 and a previous master cylinder hydraulic pressure Pmc detected by the fluid pressure sensor 62. A target value Pmc3t of the servo pressure Pmc3 for increasing the master cylinder hydraulic pressure Pmc is calculated on the basis of the master cylinder hydraulic pressure changing speed dPmc. The ECU 18 calculates the pressure increasing amount pmcat by the HAB control corresponding to the electric current value of the control signal to be outputted to the linear value 31 on the basis of the target value Pmc3t of the servo pressure Pmc3.

The program then proceeds to step 105 at which the control signal for the HAB control is outputted. That is, the control signal having the electric current value for the pressure increasing amount pmcat by the HAB control calculated at step 104 is outputted to the linear valve 31. Then, the program returns to step 100. Therefore, the hydraulic pressure P3 corresponding to the opening degree of the linear valve 31 is introduced to the third pressure chamber 28, wherein the master cylinder hydraulic pressure Pmc is automatically increased by the hydraulic pressure P3 of the third pressure chamber 28. After outputting the control signal for the HAB control at step 105, the program returns to step 100.

As described above, when the master cylinder hydraulic pressure Pmc is being controlled, the ECU 18 controls the solenoid valves 33a, 34a, 35a, 36a, 33b, 34a, 35a, 36a, and the electric motor 40 which are included in the hydraulic pressure controlling device 17. Therefore, the braking force applied to each wheel is controlled.

According to the brake control device of the above-described embodiment of the present invention, when the ABS control is performed on a road having a low coefficient of friction μ where each wheel brake cylinder brake pressure should be adjusted to become a low value, the HAB control is stopped to restrain the increase of the master cylinder hydraulic pressure Pmc. That is, the brake control device according to this embodiment of the present invention restrains the increase of the master cylinder hydraulic pressure Pmc on the basis of which the wheel brake cylinder brake pressure applied to each wheel brake cylinder 13, 14, 15, 16 is controlled, wherein the stability of the ABS control operation is improved. Further, the brake control device decreases the pressure differential between the master cylinder hydraulic pressure Pmc and each wheel brake cylinder brake pressure so that undesired noise caused while performing anti-skid control is decreased.

The operation of the brake control device according to another embodiment of the present invention is described below with reference to the flowchart in FIGS. 4a and 4b. The operation of the brake control device according to this second embodiment is applicable for a road in which the coefficient of friction μ is varied. For purposes of simplifying the description, a detailed discussion of the structure which is identical to that described above is omitted.

Figure 4A:
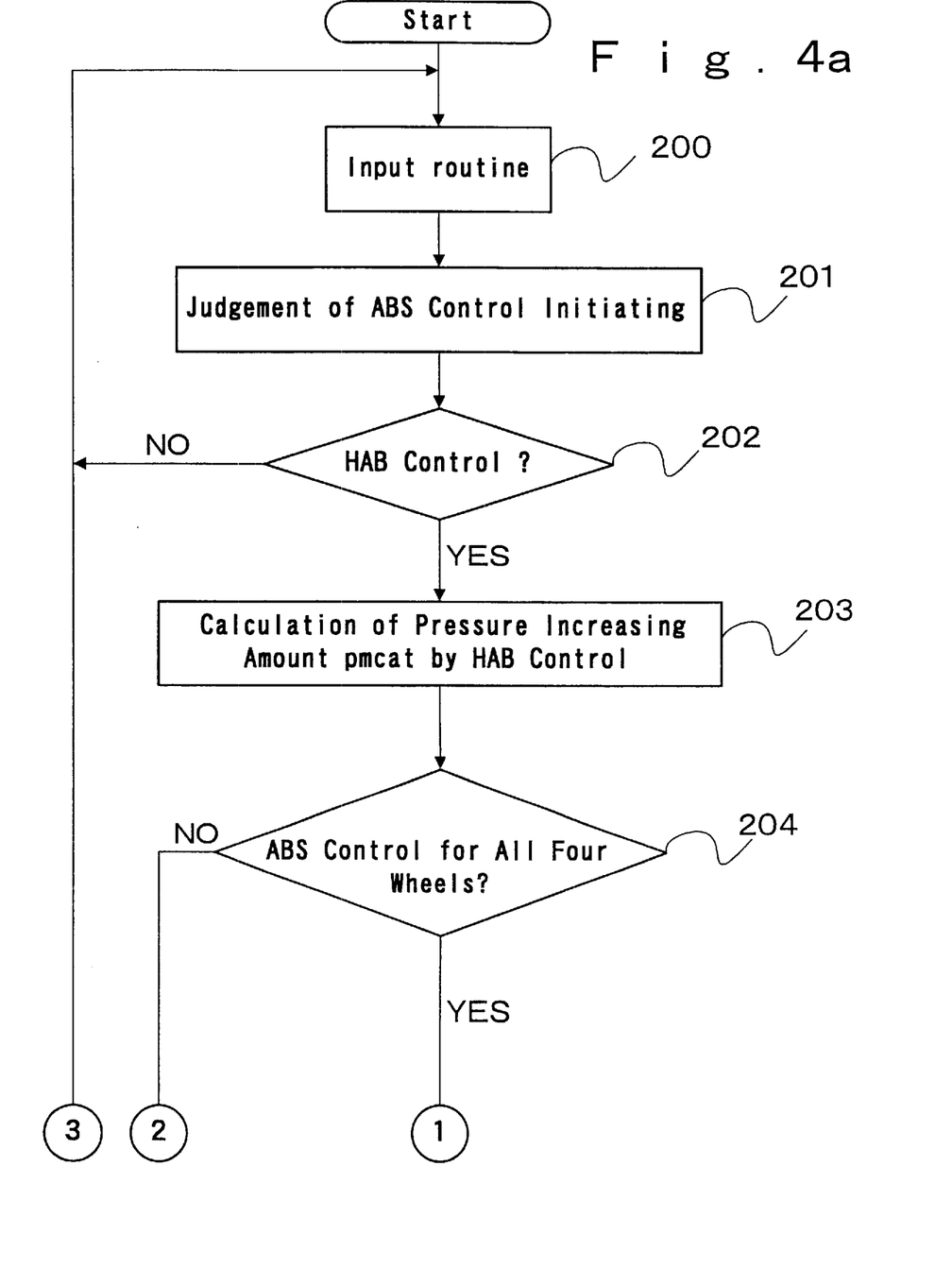
FIGS. 4a and 4b illustrate a flowchart depicting the overall operation of the ECU according to another embodiment of the present invention.
Figure 4B:
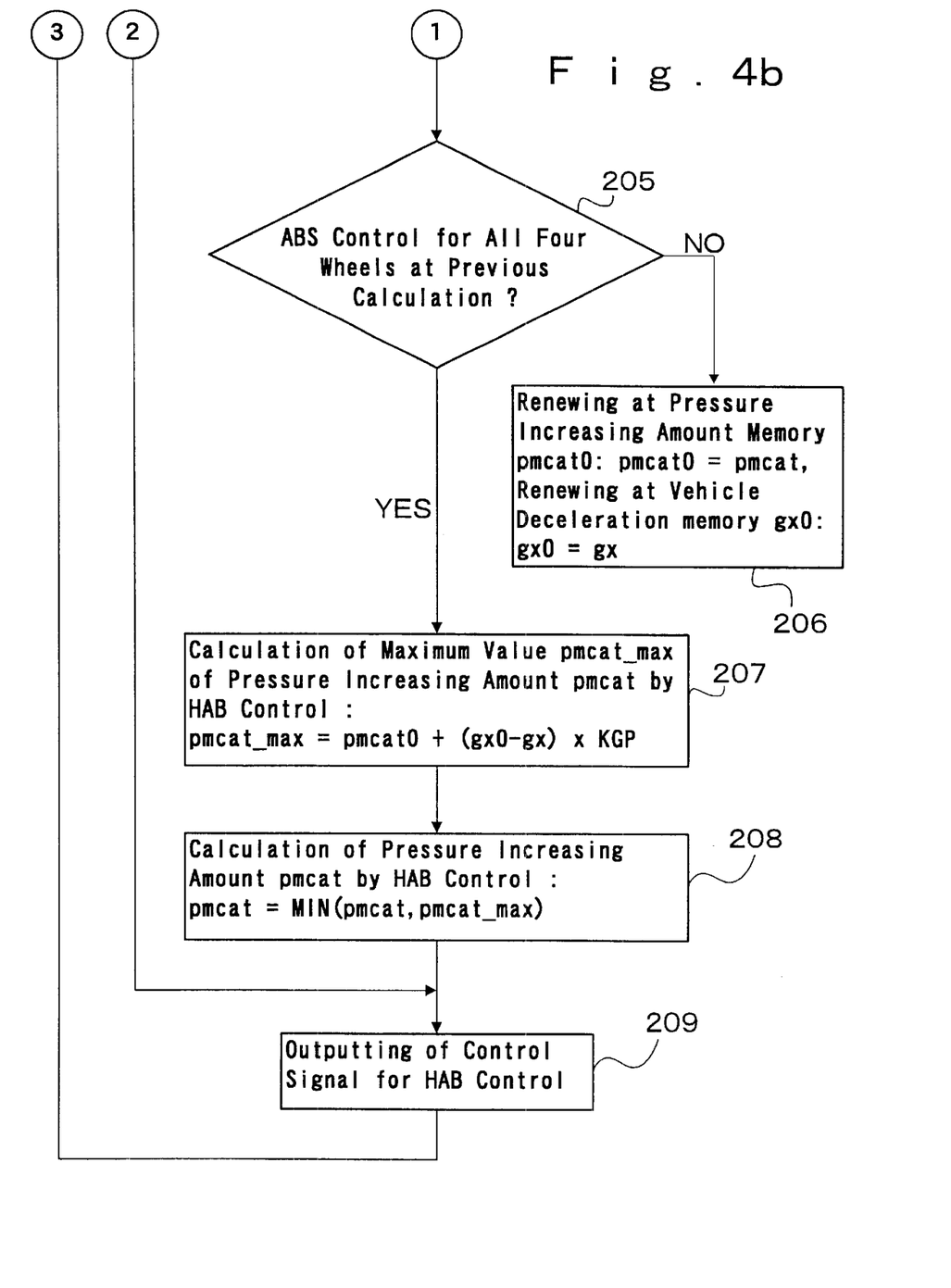

The routine shown in FIGS. 4a and 4b is performed or initiated when the ignition switch of the vehicle is turned on and the engine is activated. After completing the initial setting, the program proceeds to step 200. At step 200, the input routine is performed in the same manner as step 100.

The program then proceeds to step 201 at which the ECU 18 determines if a current control mode is the ABS control. The determination of ABS control is being carried out is performed by recognizing each flag of each control mode renewed in response to the vehicle driving condition detected by the input routine at step 200. The determination of the ABS control is performed for each wheel.

At step 202, the ECU 18 judges if the HAB control of the master cylinder hydraulic pressure Pmc is being performed. The judgment of the HAB control is performed by recognizing if the detected master cylinder hydraulic pressure Pmc exceeds the HAB control initiating set pressure KPMC corresponding to the maximum brake pedal operational force boosted by the vacuum booster 19. If the ECU 18 judges that the HAB control is not being performed, the program returns to step 200. If the ECU 18 judges that the HAB control is being performed, the program proceeds to step 203.

At step 203, the pressure increasing amount pmcat by the HAB control is calculated. More specifically, the master cylinder hydraulic pressure changing speed dPmc is calculated based on the pressure differential between this master cylinder hydraulic pressure Pmc' detected by the fluid pressure sensor 62 and the previous master cylinder hydraulic pressure Pmc detected by the fluid pressure sensor 62. The target value Pmc3t of the servo pressure Pmc3 for increasing the master cylinder hydraulic pressure Pmc is calculated on the basis of the master cylinder hydraulic pressure changing speed dPmc. The ECU 18 calculates the pressure increasing amount pmcat by the HAB control corresponding to the electric current value of the control signal to be outputted to the linear valve 31 on the basis of the target value Pmc3t of the servo pressure Pmc3.

At step 204, the ECU 18 judges if the ABS control is being applied to all four wheels. The judgment of ABS control for all four wheels is performed on the basis of the flag of each control mode recognized at step 200. When the ECU 18 judges at step 204 that the ABS control is being applied to all four wheels, the program proceeds to step 205.

At step 205, the ECU 18 judges if the ABS control was applied to all four wheels at a previous calculation. If the ECU 18 judges that the ABS control was applied to all four wheels at the previous calculation as well, the program proceeds to step 207. On the other hand, if the ECU 18 judges at step 205 that the ABS control was not applied to all four wheels at the previous calculation, the program proceeds to step 206. At step 206, the ECU 18 renews each value memorized in a pressure increasing amount memory pmcat0 by the HAB control and in the vehicle deceleration memory gx0. That is, the value memorized in the pressure increasing amount memory pmcat0 by the HAB control is renewed at the pressure increasing amount pmcat by the HAB control detected at step 203. The value memorized in the vehicle deceleration gx0 is renewed at the vehicle deceleration gx detected by the vehicle acceleration sensor 82. The vehicle deceleration is designated with a negative value of the vehicle deceleration gx while the vehicle acceleration is designated with a positive value of the vehicle deceleration gx.

At step 207, the ECU 18 calculates a maximum value pmcat_max of the pressure increasing amount pmcat by the HAB control in accordance with the following equation:

$$pmcat\_max = pmcat0 + (gx0 - gx) \times KGP;$$

where KGP is a predetermined positive coefficient for converting the vehicle deceleration to the pressure increasing amount pmcat by the HAB control, i.e. the electric current value of the control signal to be outputted to the linear valve 31.

As described above, if the ABS control is applied to all four wheels this time, the vehicle deceleration memory gx0 is set to be equal to the vehicle deceleration gx detected by the vehicle acceleration sensor 82, wherein the maximum value pmcat_max of the pressure increasing amount pmcat by the HAB control is set to be equal to the pressure increasing amount pmcat by the HAB control calculated at step 203. On the other hand, if the ABS control operation applied to all four wheels is being continued, the maximum value pmcat_max of the pressure increasing amount pmcat by the HAB control is corrected based on or corresponding to a vehicle deceleration change which has been generated from the time when the ABS control was applied to all four wheels. For example, when the coefficient of friction μ on the road is increased while ABS control is being applied to all four wheels, the vehicle deceleration is decreased, i.e., an absolute value of the vehicle deceleration is increased. Therefore, the maximum value pmcat-max of the pressure increasing amount pmcat by the HAB control is increased corresponding to the decreased vehicle deceleration. The above described correction is performed for reflecting the increasing in the coefficient of friction μ on the road under the ABS control being applied to all four wheels upon the electric current value of the control signal to be outputted to the linear valve 31. Therefore, the HAB control of the master cylinder hydraulic pressure Pmc is controlled corresponding to the coefficient of friction μ on the road.

After calculating the maximum value pmcat_max of the pressure increasing amount pmcat by the HAB control at step 207, the program proceeds to step 208. A final pressure increasing amount pmcat by the HAB control is renewed at the smaller amount of either the pressure increasing amount pmcat by the HAB control calculated at step 203 or the maximum value pmcat_max of the pressure increasing amount pmcat by the HAB control calculated at step 207. Then, the program proceeds to step 209.

At step 204, if the program judges the ABS control is not being applied to all four wheels, the final pressure increasing amount pmcat by the HAB control is set at the pressure increasing amount pmcat by the HAB control calculated at step 203. Then, the program proceeds to step 209.

At step 209, the control signal for the HAB control is outputted. That is, the control signal having the electric current value for the final pressure increasing amount pmcat by the HAB control is outputted to the linear valve 31. Then, the program returns to step 200. Therefore, the hydraulic pressure P3 corresponding to the opening degree of the linear valve 31 is introduced into the third pressure chamber 28, wherein the master cylinder hydraulic pressure Pmc is automatically increased by the hydraulic pressure P3 of the third pressure chamber 28.

As described above, when the master cylinder hydraulic pressure Pmc is being controlled, the ECU 18 controls the solenoid valves 33a, 34a, 35a, 36a, 33b, 34a, 35a, 36a, and the electric motor 40 which are included in the hydraulic pressure controlling device 17. Therefore, the braking force applied to each wheel is controlled in the same manner as the first embodiment of the present invention described above.

As described above, when the ABS control is being applied to all four wheels, the final pressure increase amount pmcat by the HAB control after the initiation of the ABS control is corrected in response to the vehicle deceleration change while employing the pressure increasing amount pmcat by the HAB control at the initiation of the ABS control (the pressure value memorized in the pressure increasing amount memory pmcat0) and the vehicle deceleration at the initiation of the ABS control (the vehicle deceleration memorized in the vehicle deceleration memory gx0) as a standard. That is, when the coefficient of friction $\mu$ on the road is increased while the ABS control is being applied to all four wheels and the vehicle deceleration is decreased (the absolute value of the vehicle deceleration is increased), the maximum value pmcat_max of the pressure increasing amount pmcat by the HAB control is increased corresponding to the vehicle deceleration decrease amount. In this manner, the final pressure increasing amount pmcat by the HAB control is corrected. Accordingly, while the ABS control is being applied to all four wheels, the change of the coefficient of friction $\mu$ on the road is reflected in the electric current value of the control signal to be outputted to the is linear valve 31, namely the master cylinder hydraulic pressure automatically increasing control. Therefore, a desirable ABS control is performed.

The ABS control sometimes may not be applied to all four wheels, especially when the vehicle is driving on a split type road having different coefficients of friction it at, for example, the left and right sides. In this case, the control signal having the electric current value for the pressure increasing amount pmcat by the HAB control calculated on the basis of the master cylinder hydraulic pressure changing speed dPmc is outputted. directly to the linear valve 31. Therefore, with the increasing operation of the master cylinder hydraulic pressure Pmc on the basis of the output of the pressure increasing amount pmcat by the HAB control, a sufficient master cylinder hydraulic pressure Pmc is supplied to the wheels requiring a larger braking force. Therefore, a desirable ABS control is performed.

It is to be understood that the brake control device of the present is not necessarily limited to the above described embodiments as various modifications can be employed.

According to the first embodiment of the present invention, when the ABS control is performed while on a road having a low coefficient of friction $\mu$, the HAB control is stopped. However, the HAB control may be restrained instead of being stopped. More specifically, the target value Pmc3$t$ of the servo pressure Pmc3 calculated at step 104 on the basis of the master cylinder pressure changing speed dPmc is corrected to become smaller than a general value. Alternatively, the pressure increasing amount pmcat by the HAB control calculated on the basis of the target value Pmc3$t$ of the servo pressure Pmc3, i.e., the electric current value of the control signal to be outputted to the linear valve 31, is corrected to become smaller than a general value. With this alternative, the same effectiveness as in the first embodiment is produced.

According to the first and second embodiments of the present invention, the hydraulic pressure controlling device 17 connects each wheel brake cylinder 13, 14, 15, 16 to the master cylinder 20 and employs the front-rear hydraulic circuit system. However, the present invention can also be employed in the context of a hydraulic pressure controlling device 17 that is a so-called diagonal hydraulic circuit system.

According to both embodiments of the present invention described above, the master cylinder 20 is a tandem type master cylinder having two pressure chambers defined by the two master pistons. However, the master cylinder 20 may be a single type master cylinder having a single master piston.

In addition, although the brake control device is applicable for vehicle stability control and the traction control, it is to be understood that the function for such controls may be omitted.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A brake control device for a vehicle comprising:
   a brake operating member;
   hydraulic pressure generating means for generating a master cylinder hydraulic pressure in a master cylinder in response to an operating force applied to said brake operating member;
   a wheel;
   a wheel brake cylinder mounted on said wheel;
   automatic pressure increasing control means for increasing said master cylinder hydraulic pressure automatically in response to said operating force applied to said brake operating member;
   braking force control means for controlling hydraulic pressure applied to said wheel brake cylinder using said master cylinder hydraulic pressure;
   coefficient of friction detecting means for detecting a coefficient of friction on a road; and
   automatic pressure increasing restraining means for restraining a pressure increase amount of said master cylinder hydraulic pressure by said automatic pressure increasing control means when an anti-skid control is being performed by said braking force control means when the coefficient of friction detected by said coefficient of friction detecting means is less than a predetermined value, the automatic pressure increase restraining means adjusting the master cylinder hydraulic pressure to be lower when the coefficient of friction detected by the coefficient of friction detecting means is less than the predetermined value than when the coefficient of friction detected by the coefficient of friction detecting means is greater than the predetermined value.

2. The brake control device for a vehicle according to claim 1, wherein:

said hydraulic pressure generating means includes a fluid pressure booster;

said braking force control means includes a hydraulic pressure controlling device and an electronic control unit; and said automatic pressure increasing control means includes a hydraulic pressure increasing unit.

3. The brake control device for a vehicle according to claim 2, wherein said fluid pressure booster is a vacuum booster operatively connected to said master cylinder.

4. The brake control device for a vehicle according to claim 2, wherein said master cylinder is a tandem-type master cylinder having two master pistons and two pressure chambers defined by said two master pistons.

5. The brake control device for a vehicle according to claim 2, wherein said hydraulic pressure controlling device includes a main conduit, a branch conduit, a reservoir, a first control valve, a second control valve, an electric motor, and a pump.

6. The brake control device for a vehicle according to claim 5, wherein:

said first control valve is a normally-open type control valve operated by said electronic control unit; and said second control valve is a normally-closed type control valve operated by said electronic control unit.

7. The brake control device for a vehicle according to claim 2, wherein said electronic control unit is connected to a fluid pressure sensor, a stop lamp sensor, a vehicle acceleration sensor, a yaw rate sensor and a wheel speed sensor, and said hydraulic pressure increasing unit and said hydraulic pressure controlling device are controlled based on each detected signal from each said sensor.

8. A brake control device for a vehicle comprising:

a brake operating member;

hydraulic pressure generating means for generating a master cylinder hydraulic pressure in a master cylinder in response to an operating force applied to said brake operating member;

a plurality of wheels;

a plurality of wheel brake cylinders each mounted on a respective one of wheels;

a pressure chamber defined in said master cylinder;

pressure increasing means for introducing a servo pressure into said pressure chamber to increase said master cylinder hydraulic pressure with said servo pressure;

automatic pressure increasing control means for controlling said servo pressure introduced to said pressure chamber by said pressure increasing means and for controlling a pressure increase amount of said master cylinder hydraulic pressure;

braking force control means for controlling the hydraulic pressure applied to each wheel brake cylinder using said master cylinder hydraulic pressure;

servo pressure memorizing means for memorizing said servo pressure controlled by said-automatic pressure increasing control means when an anti-skid control begins to be applied to all of said wheels by said braking force control means;

vehicle deceleration change detecting means for detecting a vehicle deceleration change occurring after said anti-skid control begins to be applied to all vehicle wheels;

servo pressure correcting means for correcting said memorized servo pressure on the basis of said vehicle deceleration change detected by said vehicle deceleration change detecting means; and said automatic pressure increasing control means employing said corrected servo pressure as an upper limit of said servo pressure and controls said pressure increase amount of said master cylinder hydraulic pressure while said anti-skid control is being applied to said all of the wheels.

9. The brake control device for a vehicle according to claim 8, wherein said hydraulic pressure generating means includes a fluid pressure booster, said automatic pressure increasing control means includes a hydraulic pressure increasing unit, and said braking force control means includes a hydraulic pressure controlling device and an electronic control unit.

10. The brake control device for a vehicle according to claim 9, wherein said fluid pressure booster is a vacuum booster operatively connected to said master cylinder.

11. The brake control device for a vehicle according to claim 9, wherein said master cylinder is a tandem-type master cylinder having two master pistons and two pressure chambers defined by said two master pistons.

12. The brake control device for a vehicle according to claim 9, wherein said hydraulic pressure controlling device includes a main conduit, a branch conduit, a reservoir, a first control valve, a second control valve, an electric motor, and a pump.

13. The brake control device for a vehicle according to claim 12, wherein:

said first control valve is a normally-open type control valve operated by said electronic control unit; and said second control valve is a normally-closed type control valve operated by said electronic control unit.

14. The brake control device for a vehicle according to claim 9, wherein:

said electronic control unit is connected to a fluid pressure sensor, a stop lamp sensor, a vehicle acceleration sensor, a yaw rate sensor and a wheel speed sensor; and said hydraulic pressure increasing unit and said hydraulic pressure controlling device are controlled based on signals from each of said sensors.

15. The brake control device for a vehicle according to claim 8, wherein said servo pressure correcting means corrects said memorized servo pressure to increase when a decreasing change of said vehicle deceleration is detected by said vehicle deceleration change detecting means.

* * * * *